United States Patent
Wu

(10) Patent No.: US 7,272,092 B2
(45) Date of Patent: Sep. 18, 2007

(54) ADAPTIVE LEVEL-CUTTING METHOD OF CD-ROM DRIVE'S RADIO FREQUENCY RIPPLE SIGNAL

(75) Inventor: Jan Tang Wu, Chia I (TW)

(73) Assignee: Ali Corporation, Taipei (TW)

( * ) Notice: Subject to any disclaimer, the term of this patent is extended or adjusted under 35 U.S.C. 154(b) by 738 days.

(21) Appl. No.: 10/682,115

(22) Filed: Oct. 10, 2003

(65) Prior Publication Data

US 2005/0078687 A1 Apr. 14, 2005

(30) Foreign Application Priority Data

Aug. 8, 2003 (TW) .............................. 92121823 A

(51) Int. Cl.
*G11B 7/00* (2006.01)
(52) U.S. Cl. .................... 369/53.28; 369/59.21
(58) Field of Classification Search ............. 369/53.28; G11B 7/00
See application file for complete search history.

(56) References Cited

U.S. PATENT DOCUMENTS

| | | | |
|---|---|---|---|
| 6,324,135 B1 * | 11/2001 | Kim et al. | 369/47.17 |
| 6,434,093 B2 * | 8/2002 | Park | 369/44.25 |
| 6,728,184 B2 * | 4/2004 | Chan | 369/53.28 |
| 6,934,234 B2 * | 8/2005 | Lai | 369/53.35 |

* cited by examiner

*Primary Examiner*—A M Psitos
(74) *Attorney, Agent, or Firm*—Troxell Law Office, PLLC

(57) ABSTRACT

An adaptive level-cutting method of a radio frequency ripple signal for a CD-ROM drive is proposed. A digital signal processor is added to accomplish adaptive cutting of the central level of the radio frequency ripple signal for generating an accurate radio frequency zero cross signal, thereby accomplishing tracking control, short seeking control and long seeking control of an optical disc when regions with data and regions without data of the optical disc are staggered.

14 Claims, 5 Drawing Sheets

ADAPTIVE LEVEL-CUTTING METHOD OF CD-ROM DRIVE'S RADIO FREQUENCY RIPPLE SIGNAL

FIELD OF THE INVENTION

The present invention relates to an adaptive level-cutting method for a radio frequency ripple signal for a CD-ROM drive and, more particularly, to an adaptive method for cutting the central level of a CD-ROM drive's radio frequency ripple signal.

BACKGROUND OF THE INVENTION

In common optical disc drive systems like CD-ROM drives and digital versatile disc (DVD) players, a flatbed motor is used to drive a flatbed having an optical read head for performing tracking and seeking actions for an optical disc.

A plurality of tracks for recording data is located on an optical disc. The so-called seeking action moves the optical read head to a track having data to be read. The seeking action can be divided into short seeking and long seeking. Short seeking generally means under 1000 tracks are searched. Short seeking is necessarily quick and accurate. Therefore, a closed loop control is required. On the other hand, quick seeking is required for long seeking. Therefore, an open loop control is required. In order to keep the object lens in the central position, a central error control is performed on a tracking actuator. Usually, an accurate short seeking is performed after a long seeking for positioning.

The tracking action is a horizontal motion of a lens for locking onto the track to be read. After the tracking action, a laser beam illuminates the optical disc. The reflected light is received by a photodetector on the optical read head. Original signals required for data signals on the optical disc and various controls are then output.

Signals obtained by the optical read head are combined by a front-stage amplifier into a radio frequency (RF) signal and some control signals such as a tracking error (TE) signal, a radio frequency ripple (RFRP) signal, a tracking error zero cross (TEZC) signal and a radio frequency zero cross (RFZC) signal. Existent optical disc drives make use of the RFZC signal and the TEZC signal to generate the counting track mechanism for short seekings.

The RFRP signal is obtained from the read RF signal. The RF signal is a data signal read from the optical disc. When the lens is aligned with a track, the RF signal is at maximum amplitude. When the lens is between two tracks, the RF signal is at minimum amplitude. The RFRP signal is obtained by subtracting the lower envelope from the upper envelope of the RF signal, or performing a low-pass filtering on the RF signal.

The RFZC signal is obtained from the read RFRP signal. In a conventional method, a fixed value is set as a slice level when performing tracking actions. For instance, the zero value of the amplitude of the RFRP signal is set as the slice level. If the value of the RFRP signal is greater than the slice level, the value of the RFZC signal is high. If the value of the RFRP signal is less than the slice level, the value of the RFZC signal is low. The main function of the CD-ROM drive's RFZC signal is to count tracks, and can be used regardless of long or short seeking control.

In another conventional method, the slice level is generated by a hardware circuit low-pass filter. As shown in FIG. 1, a conventional hardware low-pass central level generator comprises a capacitor (C) 100, a resistor (R) 102 and a comparator 104. The RFRP signal is input via terminal X. A reference voltage (Vref) is input via terminal Y. The RFZC signal is output via terminal Z. The RFRP signal passes through the low-pass filter composed of the capacitor 100 and the resistor 102 and is then compared with the RFRP signal by the comparator 104 to generate the RFZC signal.

However, when regions with data and regions without data of an optical disc are staggered, the RFRP signal obtained from the regions with data has a greater amplitude while the RFRP signal obtained from the regions without data has a lesser amplitude. If the above conventional methods are adopted, the obtained RFZC signal is distorted to cause problems in seeking actions.

SUMMARY OF THE INVENTION

One object of the present invention is to provide an adaptive level-cutting method for a CD-ROM drive's radio frequency ripple signal.

The present invention is characterized by the addition of a digital signal processor to accomplish adaptive cutting of the central level of the RFRP signal for generating an accurate RFZC signal.

The present invention is also characterized by use of low-pass filters having different bandwidths for tracking control and seeking control to accomplish real-time responses, respectively.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
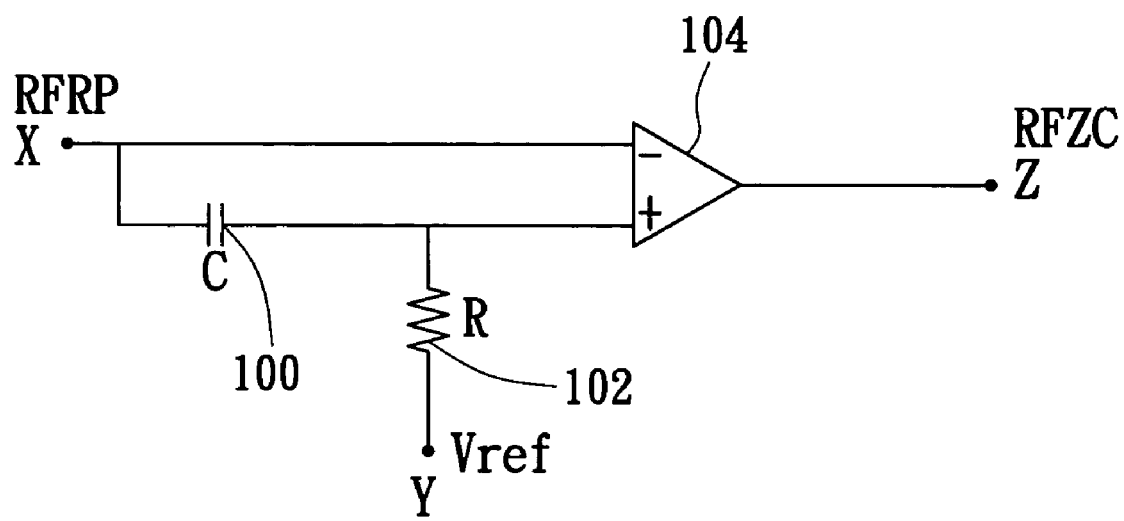
FIG. 1 is a diagram of a conventional hardware low-pass filtering central level generator.
Figure 2:
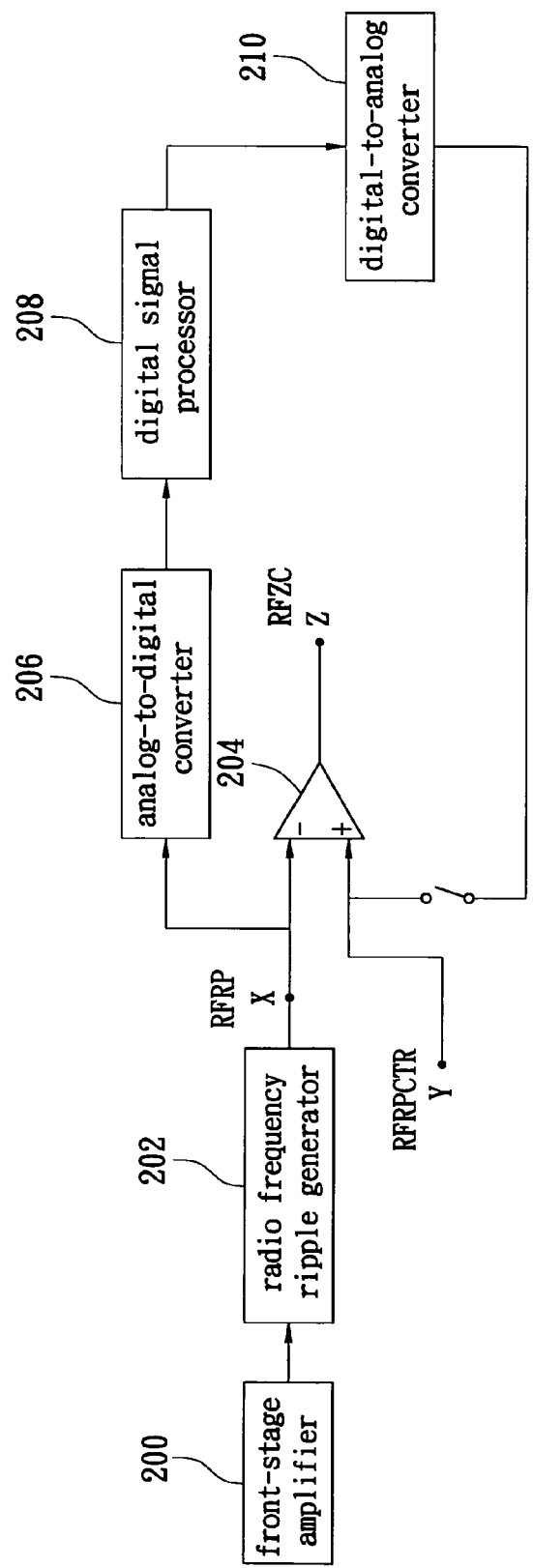
FIG. 2 is an architecture diagram of an adaptive level cutter of radio frequency ripple signal of the present invention.

As shown in FIG. 2, an adaptive level cutter of the RFRP signal of the present invention comprises a front-stage amplifier 200, an RF ripple generator 202, a comparator 204, an analog-to-digital converter (ADC) 206, a digital signal processor 208 and a digital-to-analog converter (DAC) 210. The RF ripple generator generates an RFRP signal at terminal X. An RF ripple signal central level (RFRPCTR) is input via terminal Y. An RFZC signal is output via terminal Z.

The RFRP signal is sampled by the ADC 206 and then processed by the digital signal processor 208. The obtained result is then processed by the DAC 210 and then sent to one terminal of the comparator 204 to be used as the RFRPCTR signal. After comparison with the RFRP signal, the RFZC signal is generated.

Figure 3:
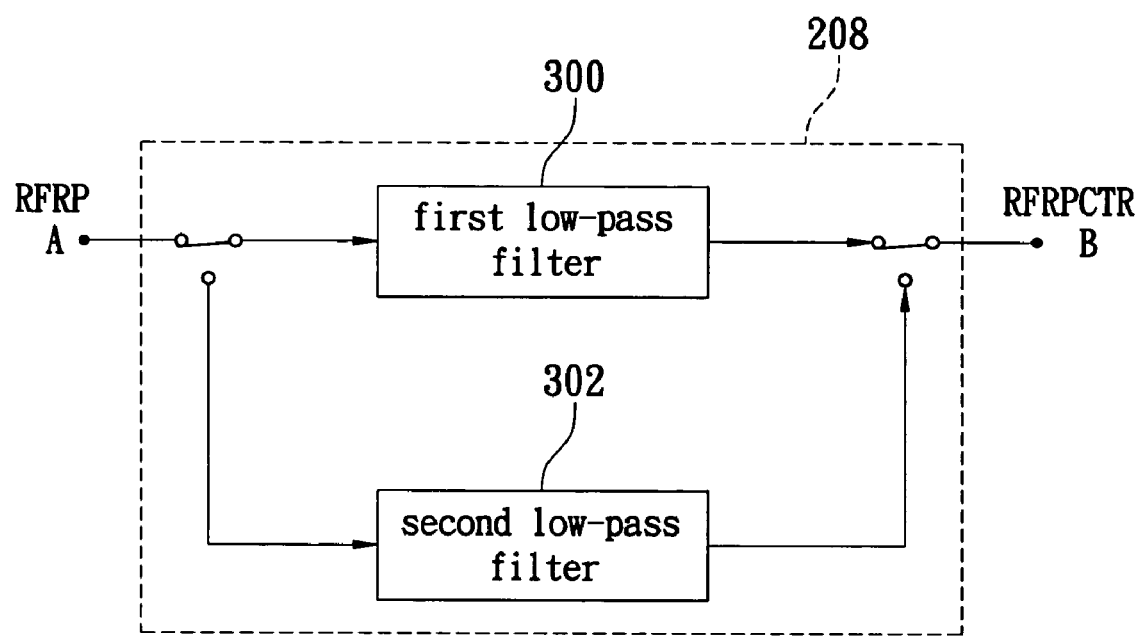
FIG. 3 is an architecture diagram of a digital signal processor used in the present invention.

As shown in FIG. 3, the digital signal processor 208 comprises a first low-pass filter 300 and a second low-pass filter 302. The RFRP signal is input via terminal A. The RFRPCTR signal is output via terminal B.

When performing tracking control, the RFRP signal is sampled by the ADC 206 and processed by the low-pass filter 300 to obtain the RFRPCTR signal, which is used for cutting out the RFZC signal. At this time, the RFZC signal is not used for special functions. But when performing seeking control, the RFZC signal plays a very important role. It not only affects the accuracy of counting track, but is also a key point for stability when the system enters a closed loop. The digital signal processor 208 automatically switches according to the system state. When performing tracking control, the first low-pass filter 300 is used. When seeking control is required, the second low-pass filter 302 is switched to. Both the first and second low-pass filters are one-stage low-pass filters with a sampling rate of 44.1 KHz. They only differ in bandwidth. Generally, the second low-pass filter 302 has a larger bandwidth to facilitate real-time response when performing seeking control.

Figure 4:
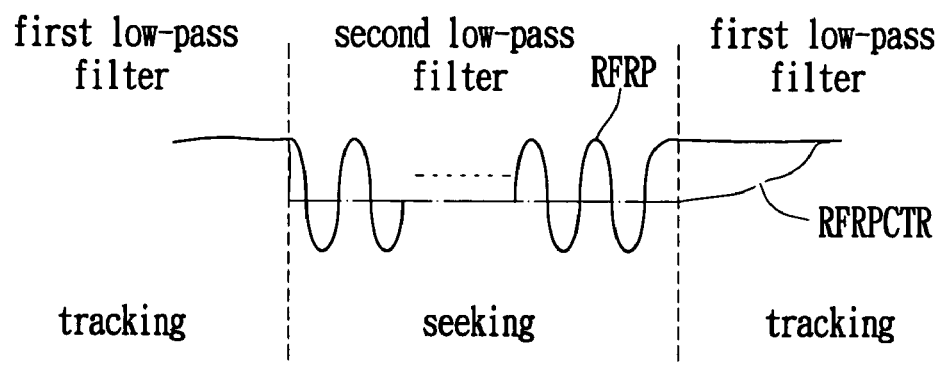
FIG. 4 is a comparison diagram of a radio frequency ripple signal and a radio frequency ripple signal central level of the present invention.
Figure 5:
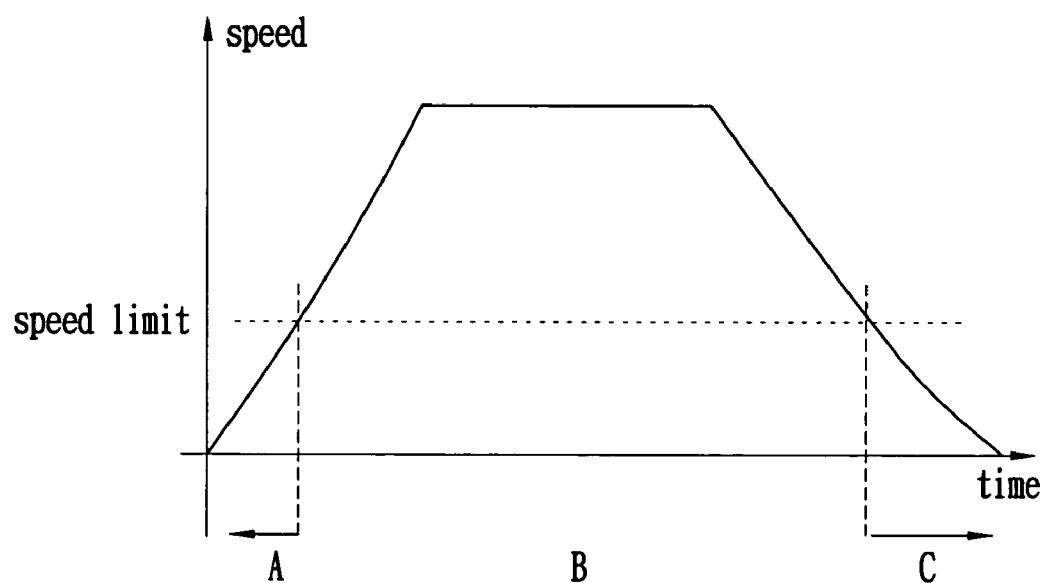
FIG. 5 is a diagram showing the renewal condition of a second low-pass filter of the present invention.

As shown in FIG. 4, when performing short seeking, the initial status value of the second low-pass filter 302 needs to be renewed to the end status value of the previous seek. The initial status value of the second low-pass filter 302 for the first seek is the status value of the second low-pass filter 302 at the instant when the system switches from the open loop to the closed loop. After the seek, the first low-pass filter 300 is immediately switched to prevent the control system from entering a hysteresis state. The RFZC signal includes an error phase to counter breaking. As shown in FIG. 5, whether the RFRP signal processed by the second low-pass filter 302 is sampled at 44.1 KHz when performing seeking control is determined by a set speed limit. When the speed is lower than the speed limit (i.e., regions A and C), the RFRPCTR signal is renewed according to a semi-track flag signal. On the contrary, when the speed is higher than the speed limit (i.e., region B), the RFRPCTR is renewed at 44.1 KHz.

The advantage of renewing the RFRPCTR signal according to the semi-track flag signal is to stably cut out the RFZC signal having accurate phase for quickly entering the closed loop after seeking. When the speed is high, the semi-track flag signal cannot be used. The RFRPCTR signal needs to be renewed quickly to cut out the RFZC signal in real time.

Figure 6:
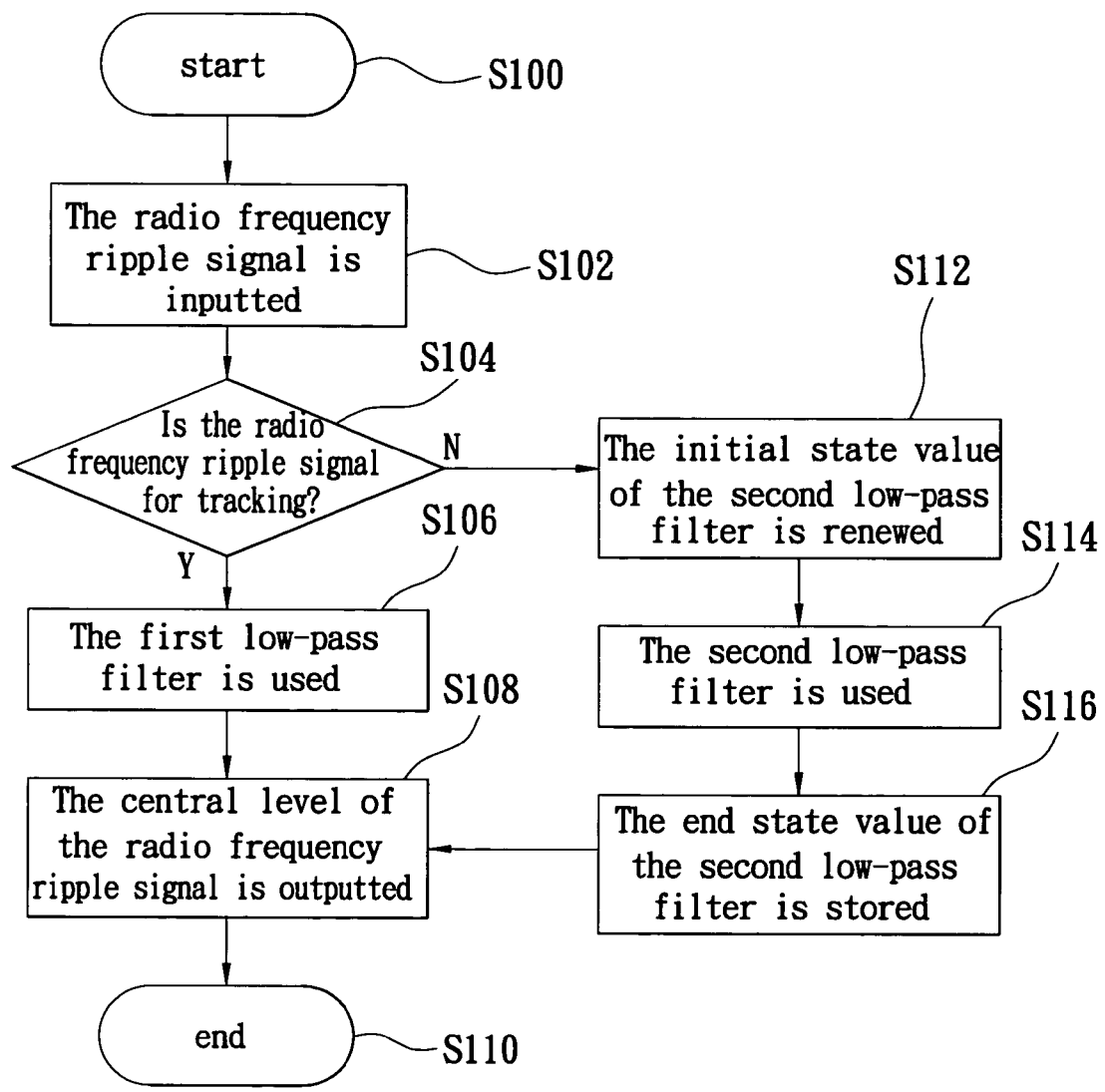
FIG. 6 is an operational flowchart of a digital signal processor used in the present invention.

FIG. 6 is an operational flowchart of the digital signal processor used in the present invention. First, the RFRP signal is input (Step S102). Next, whether the RFRP signal is for tracking is determined (Step S104). If the answer is yes, the first low-pass filter is used (Step S106). The RFRPCTR signal is then output (Step S108). Otherwise, the initial status value of the second low-pass filter is renewed to the end status value of the previous seek (Step S112). The second low-pass filter is then used (Step S114). Next, the end status value of the second low-pass filter is stored for the next seek action (Step S116). Finally, the RFRPCTR signal under the seeking control is output (Step S108).

To sum up, the present invention has the following effects:
1. A digital signal processor is added to accomplish adaptive cutting of the central level of an RFRP signal for generating an accurate RFZC signal.
2. Low-pass filters having different bandwidths are used for tracking control and seeking control, respectively, to accomplish real-time response.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An adaptive level-cutting method of a radio frequency ripple signal for a CD-ROM drive, wherein a digital signal processor is provided, said digital signal processor being capable of building a radio frequency ripple signal central level according to a radio frequency ripple signal, said method comprising the steps of:
   determining whether the digital signal processor is under tracking control; and
   inputting said radio frequency ripple signal to a first low-pass filter when the digital signal processor is under tracking control, and inputting said radio frequency ripple signal to a second low-pass filter when the digital siqnal processor is not under tracking control to generate said radio frequency ripple signal central level.

2. The adaptive level-cutting method of a radio frequency ripple signal for a CD-ROM drive as claimed in claim 1, wherein said first low-pass filter is a one-stage low-pass filter.

3. The adaptive level-cutting method of a radio frequency ripple signal for a CD-ROM drive as claimed in claim 2, wherein said one-stage low-pass filter has a lower bandwidth.

4. The adaptive level-cutting method of a radio frequency ripple signal for a CD-ROM drive as claimed in claim 1, wherein said second low-pass filter is a one-stage low-pass filter.

5. The adaptive level-cutting method of a radio frequency ripple signal for a CD-ROM drive as claimed in claim 4, wherein said one-stage low-pass filter has a higher bandwidth.

6. The adaptive level-cutting method of a radio frequency ripple signal for a CD-ROM drive as claimed in claim 1, further comprising the steps of:
   renewing an initial state of said second low-pass filter;
   storing an end state of said second low-pass filter.

7. The adaptive level-cutting method of a radio frequency ripple signal for a CD-ROM drive as claimed in claim 1, further comprising the steps of:
   providing a set speed; and
   renewing said radio frequency ripple signal central level according to a semi-track flag signal when a speed is lower than the set speed or renewing said radio frequency ripple signal central level according to a sampling frequency of said low-pass filter when the speed is higher than the set speed.

8. The adaptive level-cutting method of a radio frequency ripple signal for a CD-ROM drive as claimed in claim 1, further comprising the step of:
   inputting said radio frequency ripple signal and said radio frequency ripple signal central level to a comparator and then outputting a radio frequency zero cross signal from said comparator.

9. An adaptive level cutting device of a radio frequency ripple signal for a CD-ROM drive for building a radio frequency ripple signal central level according to a radio frequency ripple signal, said device comprising:
   an analog-to-digital converter for sampling said radio frequency ripple signal;

a digital signal processor connected to said analog-to-digital converter;
wherein said digital signal processor comprises a first low-pass filter used under tracking control and a second low-Pass filter used under non-tracking control to generate said radio frequency ripple signal central level; and
a digital-to-analog converter connected to said digital signal processor and for outputting said radio frequency ripple signal central level.

10. The adaptive level cutting device of a radio frequency ripple signal for a CD-ROM drive as claimed in claim 9, wherein said first low-pass filter is a one-stage low-pass filter.

11. The adaptive level cutting device of a radio frequency ripple signal for a CD-ROM drive as claimed in claim 10, wherein said one-stage low-pass filter has a lower bandwidth.

12. The adaptive level cutting device of a radio frequency ripple signal for a CD-ROM drive as claimed in claim 9, wherein said second low-pass filter is a one-stage low-pass filter.

13. The adaptive level cutting device of a radio frequency ripple signal for a CD-ROM drive as claimed in claim 12, wherein said one-stage low-pass filter has a higher bandwidth.

14. The adaptive level cutting device of a radio frequency ripple signal for a CD-ROM drive as claimed in claim 9, further comprising a comparator, said radio frequency ripple signal and said radio frequency ripple signal central level being input to said comparator, said comparator then outputting a radio frequency zero cross signal.

* * * * *